US009846884B2

(12) United States Patent
Milana et al.

(10) Patent No.: US 9,846,884 B2
(45) Date of Patent: Dec. 19, 2017

(54) CLICK CONVERSION SCORE

(75) Inventors: Joseph P. Milana, San Diego, CA (US); Bogdan Eugen Popescu, Hercules, CA (US); Colin Andrew Shepherd, San Rafael, CA (US)

(73) Assignee: FAIR ISAAC CORPORATION, Minneapolis, MN (US)

( * ) Notice: Subject to any disclaimer, the term of this patent is extended or adjusted under 35 U.S.C. 154(b) by 1360 days.

(21) Appl. No.: 12/120,220

(22) Filed: May 13, 2008

(65) Prior Publication Data

US 2009/0106103 A1    Apr. 23, 2009

Related U.S. Application Data

(60) Provisional application No. 60/981,388, filed on Oct. 19, 2007.

(51) Int. Cl.
*G06Q 40/00* (2012.01)
*G06Q 30/02* (2012.01)

(52) U.S. Cl.
CPC ......... *G06Q 30/02* (2013.01); *G06Q 30/0202* (2013.01); *G06Q 30/0242* (2013.01)

(58) Field of Classification Search
CPC ........ G06Q 20/00; G06Q 30/00; G06Q 30/02; G06Q 30/0202; G06Q 30/0242
USPC .................................................... 705/14, 40
See application file for complete search history.

(56) References Cited

U.S. PATENT DOCUMENTS

| | | | |
|---|---|---|---|
| 5,819,226 A | 10/1998 | Gopinathan et al. | |
| 6,330,546 B1 | 12/2001 | Gopinathan et al. | |
| 7,031,932 B1* | 4/2006 | Lipsky | G06Q 30/02 705/14.41 |
| 7,263,492 B1 | 8/2007 | Suresh et al. | |
| 7,263,506 B2 | 8/2007 | Lee et al. | |
| 2006/0004628 A1* | 1/2006 | Axe | G06Q 30/02 705/14.46 |
| 2006/0173743 A1* | 8/2006 | Bollay | G06Q 30/02 705/14.41 |
| 2007/0260624 A1* | 11/2007 | Chung | G06Q 30/02 |
| 2008/0010120 A1* | 1/2008 | Chung | G06Q 30/02 705/26.1 |
| 2008/0103887 A1* | 5/2008 | Oldham et al. | 705/14 |
| 2008/0154717 A1* | 6/2008 | Saifee | G06Q 30/02 705/14.6 |
| 2008/0270154 A1* | 10/2008 | Klots et al. | 705/1 |
| 2009/0106103 A1* | 4/2009 | Milana | G06Q 30/02 705/14.41 |
| 2010/0153216 A1* | 6/2010 | Liang et al. | 705/14.57 |

* cited by examiner

*Primary Examiner* — Edward Baird
(74) *Attorney, Agent, or Firm* — Mintz Levin Cohn Ferris Glovsky and Popeo, P.C.

(57) ABSTRACT

A Click Conversion Score (CCS) is a tool to provide a new "Ad-Exchange" for connecting Publishers and Advertisers in the Pay-per-Click advertising market. The CCS provides checks and balances into the Ad-Exchange by assessing the quality of traffic each Publisher provides Advertisers using an adaptive, multi-dimensional profiling system. This assessment is directly used in the charges billed the Advertisers. The score is adaptive, and highly dependent on the conversion feedback loop provided by Advertisers. A CCS system scores each Click and each resulting Conversion an Advertiser receives from the Ad-Exchange. In the preferred implementation, the score reflects a ratio of the measured conversion rate for a Publisher's traffic with the "expected" conversion rate based upon Advertisers histories.

14 Claims, 2 Drawing Sheets

$\Gamma_{Keyword \times Advertiser} \subset \Gamma_{AdgroupLow\ FrequencyKeywords \times Advertiser} \subset \Gamma_{Adgroup \times Advertiser} \subset \Gamma_{Advertiser\ LowFrequen\ cyKeywords \times Advertiser} \subset \Gamma_{Advertiser}$

FIG. 2

CLICK CONVERSION SCORE

CROSS REFERENCE TO RELATED APPLICATIONS

This application claims the benefit under 35 U.S.C. Section 119(e) of a provisional application U.S. Ser. No. 60/981,388, entitled "Click Conversion Score," filed Oct. 19, 2007, which is incorporated by reference herein.

BACKGROUND

This disclosure relates generally to an Ad-Exchange network, and more particularly to a scoring system and method that provides an assessment of traffic quality provided by each Publisher in the Ad-Exchange network.

The Open Pay-per-Click (PPC) Ad-Exchange is a joint offering by Fair Isaac and Think Partnership in the Pay-per-Click advertising market. The Ad-Exchange provides a new vehicle for the distribution of Advertiser's links onto Publishers' sites via an opt-in program that allows Publishers to choose which Advertisers to display on their sites. Fair Isaac provides the statistical, behavioral analytics that underpins the checks and balances into the system by generating a "Click Conversion Score" (CCS) for each Publisher that pro-rates the Advertiser's bill.

Today the major Search Engines are the middlemen for Publishers and Advertisers, placing nearly all PPC Advertising links appearing on Publishers' sites. These links are placed as either part of a "Contextual" program (links placed on the borders of Publishers normal webpage) or in conjunction with a "search" capability offered by the Publisher. The Search Engines and Publishers share in the Advertising revenue generated. For example, Google reports that about 40% of their total annual revenue (subsequently shared with Publishers) is generated by the "Google Network".

An undercurrent of suspicion has surrounded the traffic generated by these Publisher Networks. Most attention has been focused on Click Fraud: Publisher traffic generated solely for the purpose of bleeding Advertisers' budgets. Yet, a broader problem exists rationalizing the traffic quality Advertisers receive generally in a system that only provides Advertisers control over what advertisement links to place, but not where they are placed.

As an alternative to the Search Engine dominated business model, Publishers and Advertisers can manage for themselves their own PPC Network. The limitation to this model is that each Publisher must develop its own Network of Advertisers and vice-a-versa.

The Open PPC Ad-Exchange overcomes this limitation by providing a central clearinghouse for Advertisers and Publishers to join and become connected. Advertisers continue to manage their budgets at the keyword level. However a crucial ingredient is that what they are charged depends upon the traffic quality each Publisher provides the Ad-Exchange.

SUMMARY

This document describes a Click Conversion Score (CCS) tool to provide a new "Ad-Exchange" for connecting Publishers and Advertisers in the Pay-per-Click advertising market, and for assessing traffic quality that each Publisher provides the Ad-Exchange. To create such an assessment, each Advertiser provides conversion data on the PPC traffic they receive from the Ad-Exchange. The CCS is built from this conversion data. As the assessment of each Publisher's traffic quality requires this information, each Advertiser is motivated to provide the necessary conversion data.

The CCS provides checks and balances into the Ad-Exchange by assessing the quality of traffic each Publisher provides Advertisers using an adaptive, multi-dimensional profiling system. This assessment is directly used in the charges billed the Advertisers. The score is adaptive, and highly dependent on the conversion feedback loop provided by Advertisers. A CCS system scores each Click and each resulting Conversion an Advertiser receives from the Ad-Exchange. One implementation is to compare the conversion rate from each Publisher to either the average conversion rate or to some fixed standard. Considering the wide diversity of conversion rates across keywords and across Advertisers, the more advanced, and fairer approach is for the score to reflect the ratio of the measured conversion rate for a Publisher's traffic with the "expected" conversion rate based upon Advertisers histories.

The details of one or more embodiments are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

FIG. 2 shows a representation of a structural hierarchy.

Like reference symbols in the various drawings indicate like elements.

DETAILED DESCRIPTION

Figure 1:
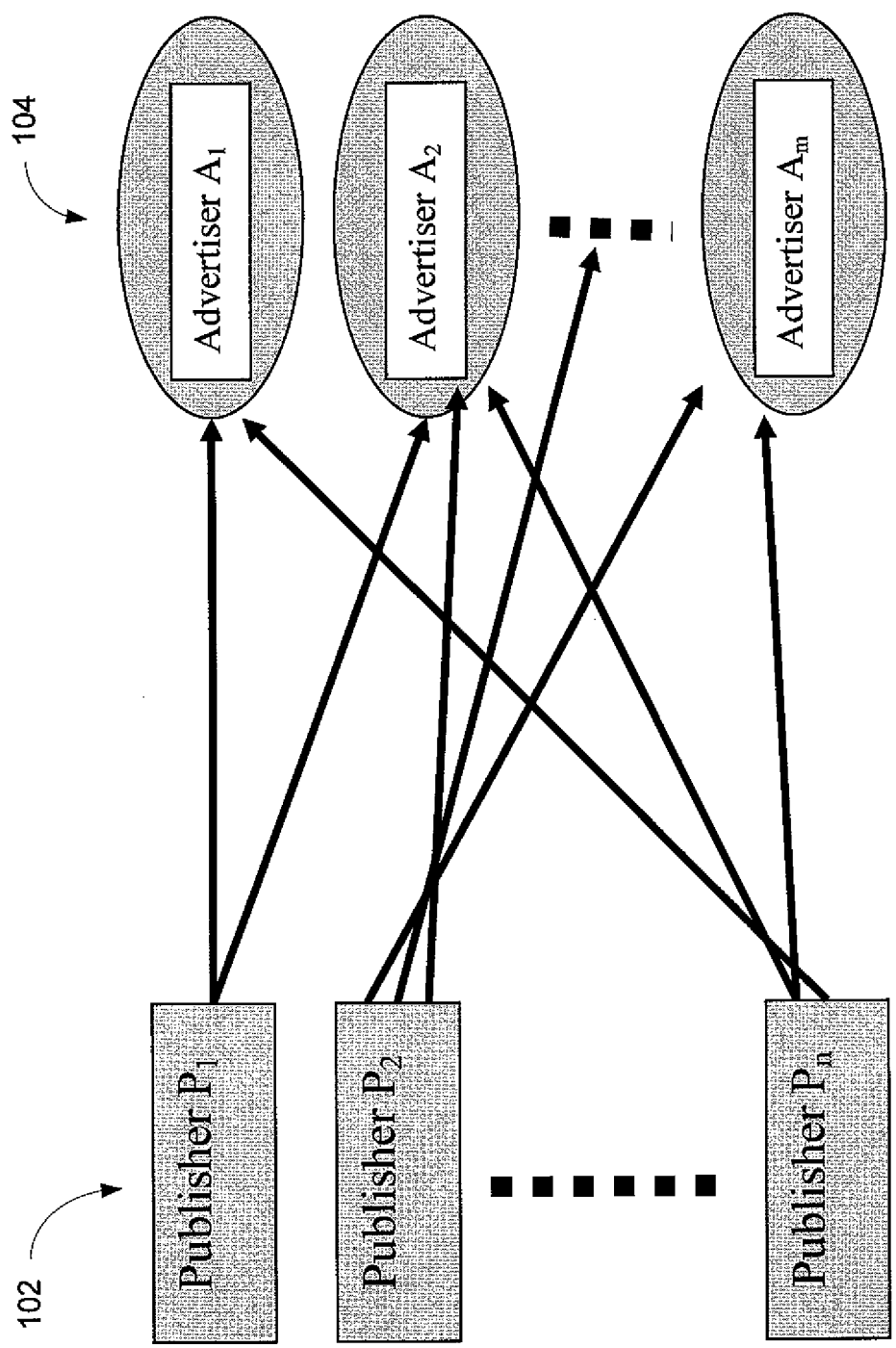
FIG. 1 is a schematic of an advertising network.

This document describes a Click Conversion Scoring system and method to generate a Click Conversion Score (CCS) that represents the conversion rates by viewers who become consumers based on an online advertisement. Each Advertiser associated with an Ad-Exchange provides conversion data on the Pay-per-Click (PPC) traffic they receive from the Ad-Exchange to build the CCS, as described in further detail below.

The CCS is preferably run in an application service provider (ASP) mode on a server. FIG. 1 shows a schematic of an advertising network 100 with n Publishers 102 (Publisher $P_1$, . . . , Publisher $P_n$) and m Advertisers 104 (Advertiser $A_1$, . . . . Advertiser $A_m$). When an entity clicks on an ad shown by an Advertiser at a Publisher's site, the entity is directed to the corresponding Advertiser's webpage that is linked to the ad.

The scores assigned to each Publisher in the network 100 can be used to compute a price per click that will be paid by the Advertisers. The cost per click, CPC, that an Advertiser pays for a click on each keyword is usually determined by an auction system and higher CPCs correspond to higher positions (search engines like Google and Yahoo employ also a quality score for a given ad in determining CPCs and ranking). The Click Conversion Score will be factored into the cost per click, the Advertiser paying less for low quality clicks (i.e., traffic corresponding to low quality Publishers).

Click Conversion Scores

The end goal of the analytic endeavor described below is to produce a score that adaptively rank-orders the Publishers according to the quality of their traffic.

At each click, a Network score as well as a Publisher score are produced for the Network and Publisher where the click occurs. As conversions are provided as an independent data feed (reflecting the lag between clicks and conversions), each conversion is likewise used to update the Publisher and Network scores. These scores represent the ratio of the actual conversion rate to the expected conversion rate for the Network or Publisher, respectively; the scores are scaled to the interval [0,100] as seen below:

$$S_{net} = 100 \times \min\left(1, \frac{NetRate}{NetExpectedRate}\right) \qquad (1)$$

$$S_{pub} = 100 \times \min\left(1, \frac{PubRate}{PubExpectedRate}\right) \qquad (2)$$

The following two sections give some details about computing Network Scores and Publisher Scores. The Appendix contains sample code snippets from the actual implementation.

In order to accommodate temporal changes that often occur in a dynamic space such as Internet advertising it is preferable to use recent history when computing the conversion rates in formulas (1) and (2). Consider $\theta_0 \supset \theta_1 \ldots \supset \theta_n \ldots \supset \theta_{n*}$ a series of past time windows, where $\theta_0$ is the longest time window that corresponds to the entire history, and $\theta_{n*}$ corresponds to the shortest time window used in the scores computations (e.g., "last" 7 days or "last" 30 days).

The Network Conversion Rate corresponding to time window $\theta_n$ is computed as follows:

$$NetRate_{\theta_n} = \frac{DailyNetNumConversions_{\theta_n} \times |\theta_n| + K \times NetRate_{\theta_{n-1}}}{DailyNetNumClicks_{\theta_n} \times |\theta_n| + K} \qquad (3)$$

In (3), $DailyNetNumConversions_{\theta_n}$ and $DailyNetNumClicks_{\theta_n}$ are daily averages calculated using a traditional time decay methodology (i.e., derived from daily averages that are exponentially decayed in the time window under consideration); $|\theta_n|$ is the minimum of the length of the time window under consideration (e.g., 7 days, 30 days, 90 days) and the age of the Network (i.e. since history of conversions have been accumulated from Advertisers using the Network). Examples of a suitable time decay methodologies are described in U.S. Pat. No. 5,819,226, Gopinathan et al., "Fraud Detection using Predictive Modeling" (1992); U.S. Pat. No. 6,330,546, Gopinathan et al., "Risk Determination and Management using Predictive Modeling and Transaction Profiles for Individual Transacting Entities" (1998); U.S. Pat. No. 7,263,492, Lee et al., "Identification and Management of Fraudulent Credit/Debit Card Purchases at Merchant (2001).

Here, as well as in all the subsequent formulas involving number of clicks, only the clicks corresponding to Advertisers that supply feedback under the form of conversion data are considered in the computations.

Smoothing is employed here using a traditional methodology. When the time window $\theta_n$ is too short to ensure statistically significant volume (clicks, conversions), the rate from the next larger window dominates and so on; values for the parameter K were expertly chosen: K=100 is elected for robustness against low counts. For robustness the default time history window, $\theta_{n*}$, is set to 30 days (7 days was considered too short in experiments).

The highest level rate is given by:

$$NetRate_{\theta_0} = \frac{NetNumConversions + l \times K \times BaseNetRate}{NetNumClicks + K} \qquad (4)$$

Here NetNumConversions and NetNumClicks are the number of conversions and clicks from the entire history. Parameter $l \in (0,1]$ determines the starting point of the scores for the Network (see also (1) above and (7) below).

BaseNetRate is a quality standard especially useful in cases where multiple Networks are present (see Section 4); it is a derivation of the conversion rate of a "Baseline Network" and is computed by:

$$BaseNetRate = c \times \frac{DailyBaseNetNumConversions_{\theta_n} \times |\theta_n| + 0.01}{DailyBaseNetNumClicks_{\theta_n} \times |\theta_n| + 1} \qquad (5)$$

BaseNetRate is therefore an adaptive baseline quality measure representing the fraction ($c \in (0,1]$) of the conversion rate of the Baseline Network. The time window $\theta_n$ defaults to 90 days in the system to ensure a relatively stable baseline.

The Network Expected Conversion Rate is given by (6):

$$NetExpectedRate_{\theta_n} = \frac{DailyNetExpectedNumConversions_{\theta_n} \times |\theta_n| + K \times NetExpectedRate_{\theta_{n-1}}}{DailyNetNumClicks_{\theta_n} \times |\theta_n| + K}$$

and $$NetExpectedRate_{\theta_0} = \frac{NetExpectedNumConversions + K \times BaseNetRate}{NetNumClicks + K} \qquad (7)$$

The high level logic of (6) and (7) is similar with (3) and (4), respectively. Details for the computation of the $NetExpectedNumConversions_{\theta_n}$ are provided below.

For each Publisher in a given Network, scores are computed at each click and conversion belonging to the Publisher. The formulations for the Publisher actual and expected conversion rates involved in (2) resemble the ones from the previous Section. First, the Publisher Conversion Rate is given by:

$$PubRate_{\theta_n} = \frac{DailyPubNumConversions_{\theta_n} \times |\theta_n| + K \times PubRate_{\theta_{n-1}}}{DailyPubNumClicks_{\theta_n} \times |\theta_n| + K} \qquad (8)$$

and $$PubRate_{\theta_0} = \frac{PubNumConversions + l \times K \times NetRate_{\theta_n}}{PubNumClicks + K} \qquad (9)$$

At the highest level, when there are not enough counts (clicks and conversions) the Publisher's conversion rate relies on the conversion rate of the Network; parameter $l \in (0,1]$ decides the initial values of the Publisher scores (in the absence of any history) as a percentage of the Network score. Like before, the daily number of conversions and clicks corresponding to various time windows $\theta_n$ ($n \geq 1$) are computed using exponentially time decayed daily averages and clicks corresponding to Advertisers with conversion feedback are considered.

The Publisher Expected Conversion Rate is computed as follows:

$$PubExpectedRate_{\theta_n} = \frac{DailyPubExpectedNumConversions_{\theta_n} \times |\theta_n| + K \times PubExpectedRate_{\theta_{n-1}}}{DailyPubNumClicks_{\theta_n} + K} \quad (10)$$

and $$PubExpectedRate_{\theta_0} = \frac{PubExpectedNumConversions + K \times NetExpectedRate_{\theta_n}}{PubNumClicks + K} \quad (11)$$

With no history, the Publisher's expected conversion rate becomes the Network expected conversion rate. Details about the computation of the expected number of conversions are given below.

The Publisher scores are factored into the cost per click, CPC, paid by the Advertisers. In particular CPCs can become zero for clicks belonging to Publishers with zero scores. Although this scenario is a favorable one for the Advertiser, it is likely to be undesirable for Publishers that are in the money making business. The expected outcome in such cases will be the Publisher leaving the Network. To hedge against this situation, while still punishing the poor quality traffic, the system implements a buffer period where the scores are set to a lower limit greater than zero for a probation period. For example, a Publisher score may be set to five for seven consecutive days when the actual score is less tan five; if the score continue to remain smaller than five after seven days, it is set to its actual value.

Expected Conversions

In the previous sections, the formulas involving expected rates (formulas (6), (7), (10), (11)) make use of quantities that estimate "expected number of conversions". These quantities are computed by the system in an adaptive manner. Every time an ad is clicked, the expected number of conversions for the Publisher and the Network serving the ad will be updated (consistent with the strategy from the previous sections, the updates take place only when the click corresponds to an ad served by an Advertiser providing conversion feedback).

The high level picture in updating the expected number of conversions for each click is:

$$ExpectedConversions \leftarrow ExpectedConversions + ExpectedRate(\Gamma,\theta) \quad (12)$$

This formula can be used to directly update NetExpectedNumConversions (used in (7) for the Network case) or PubExpectedNumConversions (used in (11) for the Publisher case). The expected rate in (12) is also used in the updateable calculations of DailyNetExpectedNumConversions$_{\theta_n}$ (from (6)) and DailyPubExpectedNumConversions$_{\theta_n}$ (from (10)).

There are two levels of logic involved in computing the expected rate from (12): the structural logic and the temporal logic.

The structural logic is addressed first. A click occurs for a specific keyword k of a given Advertiser A. Ideally the expected rate should be computed from the click and conversion histories of the pair k×A. However, it is often the case that the counts (clicks and conversions) pertaining to the k×A are insufficient to insure statistical significance for the estimation. Therefore, a structural hierarchy can be defined as shown in equation (13) in FIG. 2.

This hierarchy shows the order that is followed when computing expected conversion rate for a given click. First, the most granular level of statistics that is sufficient to be considered statistically significant is found. In order to do this, the system starts with the finest level of statistics, the Advertiser X Keyword combination and check for a statistically significant amount of data at this structural level. If not, then the next structural level is accessed and checked for statistical significance. Eventually, if sufficient statistics do not exist at lower levels, aggregate statistics are taken for the set of all the keywords belonging to the Advertiser.

In defining intermediate levels in the hierarchy, it is desirable to group keywords in clusters that characterize similar keywords (where similarity here is defined to respect of the conversion rates). The Advertisers group keywords into adgroups and in general keywords from the same adgroup are expected to be comparable. Also low (click) frequency keywords are in general more specific than the (usually) generic high frequency keywords and therefore expected to have relatively similar conversion rates, especially when they pertain to the same adgroup. Intermediate levels in the hierarchy depicted at (13) consider the set of all low frequency keywords from the adgroup corresponding to the keyword being clicked, then the corresponding adgroup, then the set of all low frequency keywords for the Advertiser.

If the hierarchy (13) is not optimal in terms of grouping similarly converting keywords together, other types of intermediate groupings could be considered: i.e., achieving group similarity by clustering keywords using linguistics, empirical conversion data or relevant domain knowledge (e.g., brand keywords are known to convert well).

In addition to the structural logic, a temporal logic is employed to emphasize the most recent data in the spirit of Section 2. When computing the expected rate of a click in (12), similar strategies as in the formulas from Section 2 can be employed, by encompassing ingredients such as temporal decay, mixing, smoothing, etc. Smoothing can be performed as in (4) or through alternative, comparable approaches. For example, a temporal transition for a given Publisher can be computed as follows:

$$ExpectedRate_{\theta_n} = \frac{DailyNumConversions_{\theta_n}^{\Gamma} \times |\theta_n| + k}{DailyProratedNumClicks_{\theta_n}^{\Gamma} \times |\theta_n| + \frac{k}{ExpectedRate_{\theta_{n-1}}}} \quad (14)$$

In (14), DailyNumConversions$_{\theta_n}^{\Gamma}$ is derived from the weight decayed daily averages over the $\theta_n$ time period, while $\Gamma$ indicates the structural level where the conversions are counted (e.g., Advertiser X Keyword, etc). The logic for Daily ProratedNumClicks$_{\theta_n}^{\Gamma}$ is similar in nature, with the difference that it also incorporates a prorating factor that is employed to optimally deal with situations with multiple Networks of different qualities; this will be described below.

Within Publisher scoring, there are circumstances when a single Publisher constitutes all or a vast majority of the traffic for an Advertiser X Keyword. Under these circumstances, if the traffic is statistically significant, the expected conversion rate for the Keyword will be equal to (100% of traffic coming from the Publisher) or very close to (the vast majority of traffic) the conversion rate for the Advertiser X Keyword from that publisher. As a result, the system infers that this Publisher is providing traffic at or very near the expected quality for this Advertiser X Keyword. There may be circumstances where this is not true, and the Advertiser expects the quality for this keyword to be higher. However, in these cases the Advertiser has the ability to change the bid for the keyword. This will enable the Advertiser to pay the correct amount for the traffic. The example is also true at other structural levels, where an Advertiser may have an entire adgroup or even account receiving traffic from a single Publisher.

Multiple Networks

When more than one Network of Publishers is present, a significant challenge in designing an effective scoring system is the fact that the Networks might have different qualities; the traffic corresponding to the Publishers from a Network could be of a substantially lower quality (i.e., conversion rates much lower). The system addresses this challenge by employing a prorating strategy for the number of clicks computed in the expected quantities described above.

Consider for example the case of two Networks, Network N1 having a decent conversion rate (e.g., same or higher than the Baseline Network in (5)) and Network N2 having a significantly lower conversion rate and comparable or higher traffic volume. In the absence of prorating, the system would operate as follows: for every click counted at a structural level defined in (13) (e.g., Advertiser X Keyword combination) add one to the total number of clicks so far (for the number of clicks involved in (14)) disregarding of the Network where the click belongs to. In this case, the poor performances of Network N2 would diminish the expected rates of the Advertisers serviced. Therefore the Publishers in the Network N1 will appear to perform excellent and receive very high scores. If most of the scores pertaining to the Publishers from Network N1 become maximal (i.e., equal to 100) the differentiation is greatly diminished for this network, and this is not a desirable scenario.

To address this issue the system introduces prorating of the number of clicks for the quantities involved in computing expected rates (e.g., in (14)). With each new click, instead of adding one as before, a ProRate quantity is added to the clicks' tally to obtain the number of clicks used when computing, for example, Daily ProratedNumClicks$_{\theta_n}^\Gamma$ in (14). ProRate is defined as follows:

$$ProRate = Min(1, NetRate/BaseNetRate) \quad (15)$$

where BaseNetRate is given by (5) and $$NetRate = \frac{NetNumConversions + K \times BaseNetRate}{NetNumClicks + K} \quad (16)$$

Here NetNumConversions and NetNumClicks are Network specific. Network N1 is of the same or better quality than the Baseline Network which implies ProRate=1; therefore one is added to the prorated clicks tally. For the poor quality Network N2 the value of ProRate is added, which is smaller than one and proportional with the ratio of the qualities of the two Networks. The Advertiser specific metrics used in computing expected rates for Network N1's Publishers will therefore not be severely affected by substantially lower conversion rates of the Network N2. Simulations show that Publishers of comparable quality that belong to different Networks receive comparable scores.

Profiles

An Advertiser profile is kept for every Advertiser that has been encountered. This profile is used for keeping track of various updateable quantities like the metrics involved in computing the expected conversions for a click from an Advertiser when lower levels of data (e.g., Keyword X Advertiser level, Adgroup X Advertiser level, etc) are not statistically significant. Examples of such quantities are decayed daily averages for clicks, prorated clicks and conversions for various time windows (last 90 days, last 30 days, last 7 days), etc. Other related profiles collecting data at a more granular level are the Keyword X Advertiser profile and the Adgroup X Advertiser profile.

A Network profile is used to track the performance of each Network over time. This profile contains the number of clicks, filtered clicks (i.e., clicks occurring on Advertisers with conversion feedback), conversions, and expected conversions for the Network. It also contains decayed daily averages for the Network (decayed over various time windows) for the filtered clicks, conversions, and expected conversions. This profile is used to compute the Network score. Similarly the Publisher profile is used to track the performance of each Publisher over time.

There are two additional profiles in the current system: one tracking data about the Baseline Network; and one profile containing information that is used for de-duplicating clicks that occur on a given Advertiser from the same keyword with from the same IP address in a twenty-four hour window.

An adaptive system providing Click Conversion Publisher and Network Scores on each click has been described. This system underlies an Ad-Exchange that connects Publishers with Advertisers to serve Pay-Per-Click ads. This system makes use of the historical click and conversion data to produce quantitative measures for the quality of the traffic delivered in the Exchange.

The scores are used in prorating the Cost-Per-Click paid by the Advertiser according to the value of the clicks. This represents a breakthrough, providing Advertisers with a mechanism to differentiate pricing at a much finer level than the current practices. While still setting one bid per keyword in a straightforward manner, the Advertisers are seamlessly empowered through machinery that automatically optimizes the pricing for each Publisher according to the Click Conversion Score of the Publisher.

The system calculates scores based on a comparison of the actual and expected conversion rates over a Network or Publisher's history, taking into account temporal changes in both expected and historical rates while maintaining statistical significance. The expected conversion rate is determined by calculating the number of expected conversions for each click. In calculating expected conversions, first the lowest level structure with a statistically significant history is found. Next, temporal changes to the history is captured where it is statistical significant. Using this history, the system is able to capture a specific, recent, and statistically significant quantity for the expected conversions of a particular click. A collection of rapidly accessible, constantly updating profiles underlies the calculations. Finally, a click prorating system has been put in place to prevent substantial cross network effects.

Experimentation with historical data has shown that the scores produced validate well according to the opinions of experts on the Publishers as well as independent empirical evidence. The scoring system was stress-tested in comprehensive simulations that proved robustness under future changes (e.g., introducing into the Exchange new Networks of significantly different qualities and traffic volumes).

In preferred implementations, a shell provides a pre-processing of the fraudulent traffic, while the Click Conversion Scoring system adds value in weeding out extremely low quality traffic (by automatically setting scores to zero for Publishers subsequently validated as being pathologic). Alternative implementations may include additional profiles to enhance the current technology by further differentiating the pricing granularity as well as capturing additional dimensions.

One such extension in this context is the Publisher X Advertiser profile. This captures nuances of a Publisher generating different quality traffic for different Advertisers. The quality of the traffic delivered by a Publisher is given by the specifics of the Publisher's audience (e.g., the demographic composition or interests of the users visiting the site) and can be a relative metric, depending on who is the Advertiser receiving this traffic. For example, a Publisher whose traffic is mainly composed of women will fair better for an Advertiser selling female merchandise than for a different Advertiser that targets a male audience. In implementation, scoring would be performed at the Publisher X Advertiser level, and CPCs would be prorated accordingly. Another alternative includes a Publisher X Advertiser X Keyword profile.

A Keyword profile, defined across advertisers, can be used if incorporated into the structure presented in (13). Conversion rates can dramatically vary per keyword (e.g., brand keywords perform very different than generic keywords, also specific targeted keywords perform different than generic keywords); this is often valid across Advertisers. Different Advertisers might convert differently for the same keyword, so the Keyword X Advertiser level remains the ideal method to set expectations. However it is often the case that the counts at this level are statistically insignificant and the structural hierarchy in (13) is designed to address this matter. The Keyword profile brings a new dimension that could enhance the structure by "borrowing strength" from other Advertisers' data.

In another alternative implementation, geographic profiling can be used in combination with Advertisers and keywords (e.g. Geography X Advertiser, or Geography X Advertiser X Keyword). Different geographic locations can convert differently across an advertiser in some cases and can perform uniformly in other cases.

The systems and methods described herein quantify the value traffic through the use of the conversion metric. Yet another alternative implementation includes incorporating the dollar values associated with conversions, since not all conversions are equal. One of the practical obstacles for this endeavor is the accuracy of the dollar values of the conversions and the fact that not all Advertisers supply this information.

A CCS-powered pricing differentiation (prorating) provides significant value to the Advertisers directly as Advertisers will get more return on investment in a straightforward manner. The CCS also benefits Publishers indirectly, as more Advertisers will be likely to join the Ad Exchange and the current advertisers will feel compelled to spend more dollars for an expected higher return on investment.

Some or all of the functional operations described in this specification can be implemented in digital electronic circuitry, or in computer software, firmware, or hardware, including the structures disclosed in this specification and their structural equivalents, or in combinations of them. Implementations of the invention can be implemented as one or more computer program products, i.e., one or more modules of computer program instructions encoded on a computer readable medium, e.g., a machine readable storage device, a machine readable storage medium, a memory device, or a machine-readable propagated signal, for execution by, or to control the operation of, data processing apparatus.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of them. A propagated signal is an artificially generated signal, e.g., a machine-generated electrical, optical, or electromagnetic signal, that is generated to encode information for transmission to suitable receiver apparatus.

A computer program (also referred to as a program, software, an application, a software application, a script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to, a communication interface to receive data from or transfer data to, or both, one or more mass storage devices for storing data, e.g., magnetic, magneto optical disks, or optical disks.

Moreover, a computer can be embedded in another device, e.g., a mobile telephone, a personal digital assistant (PDA), a mobile audio player, a Global Positioning System (GPS) receiver, to name just a few. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The systems, methods and computer program products described herein can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Certain features which, for clarity, are described in this specification in the context of separate embodiments, may also be provided in combination in a single embodiment. Conversely, various features which, for brevity, are described in the context of a single embodiment, may also be provided in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Particular implementations have been described. Other implementations are within the scope of the following claims. For example, the steps recited in the claims can be performed in a different order and still achieve desirable results. In addition, embodiments of the invention are not limited to database architectures that are relational; for example, the invention can be implemented to provide indexing and archiving methods and systems for databases built on models other than the relational model, e.g., navigational databases or object oriented databases, and for databases having records with complex attribute structures, e.g., object oriented programming objects or markup language documents. The processes described may be implemented by applications specifically performing archiving and retrieval functions or embedded within other applications.

What is claimed:

1. A computer-implemented method for scoring an online content resource, the method comprising:
    maintaining, on electronic storage media, a publisher network profile for a publisher network comprising a plurality of publishers of online content, the publisher network profile including an indication of performance characteristics of the publisher network;
    receiving, by a computer processor via a first communication channel of the Internet, one or more click signals, each click signal representing a selection by a user of the Internet of an advertising link associated with the online content resource provided to a consumer site by at least one of the plurality of publishers of the publisher network, the advertising link linking to an online advertisement;
    receiving, by the computer processor via a second communication channel of the Internet, conversion data representing a conversion of the user to a consumer of the online advertisement associated with the advertising link, each conversion being associated with at least one click signal associated with the selection;
    measuring, by the computer processor, a time lag between each click signal received over the first communication channel of the Internet and a corresponding conversion;
    generating, by the computer processor, a click conversion score based on the conversion data and the time lag for the conversion, the click conversion score comprising a publisher network score and a publisher score;
    updating, by the computer processor, the performance characteristics of the publisher and the publisher network based on the generated click conversion score;
    modifying, in response to updating the performance characteristics of the publisher, a payment rate to the publisher for conversions represented by the conversion data; and,
    facilitating payment, in response to each conversion associated with the online content resource provided by the publisher, to the publisher at the modified payment rate.

2. The method in accordance with claim 1, wherein each click conversion score represents a propensity of traffic generated by the advertisement link associated with the online content resource to convert.

3. The method in accordance with claim 1, wherein the publisher network score represents a ratio of an actual conversion rate associated with the publisher network to an expected conversion rate for the publisher network having the online content resource.

4. The method in accordance with claim 1, wherein the publisher score represents a ratio of an actual conversion rate associated with a publisher to an expected conversion rate for the publisher that publishes the online content resource, the expected conversion rate being based on conversion history associated with advertisers connected with the publisher.

5. The computer-implemented method of claim 1, wherein generating the at least one click conversion score comprises:
    defining, by the computer processor, a structural hierarchy, the structural hierarchy being configured to organize the received one or more click signals and the received conversation data into a statistically significant data set; and,
    defining, by the computer processor, a temporal logic, the temporal logic being configured to assign increased significance to more recent time lag measurements compared to less recent time lag measurements.

6. The computer-implemented method of claim 1, further comprising:
    maintaining, on the electronic storage media, a plurality of publisher network profiles for a plurality of publisher networks, each publisher network having publisher performance characteristics for the plurality of publishers, each publisher network profile including an indication of performance characteristics for each publisher network;

normalizing the performance characteristics for the plurality of publisher networks based on traffic quality scores for each of the plurality of networks, the normalizing causing publishers with similar publisher performance characteristics in different publisher networks to have similar publisher scores.

7. A computer-implemented method for scoring an online content resource associated with a network, the method comprising:

maintaining, on electronic storage media, a publisher network profile for a publisher network having a plurality of publishers, the publisher network profile including an indication of performance characteristics of the publisher network;

receiving, by a computer processor via a first communication channel of the Internet, one or more click signals, each click signal representing a selection by a user of an advertising link associated with the online content resource provided by a publisher associated with the publisher network;

receiving, by the computer processor via a second communication channel of the Internet, conversion data representing a conversion of the user to a consumer of the online advertisement associated with the advertising link, each conversion being associated with at least one click signal;

measuring, by the computer processor, a time lag between each click signal received over the first communication channel of the Internet and a corresponding conversion;

generating, by the computer processor, a click conversion score for the publisher network based on an association of the one or more click signals and conversion data and the time lag, the click conversion score comprising a publisher network score associated with the publisher network and a publisher score, the click conversion score representing a ratio of an actual conversion rate associated with the publisher network to an expected conversion rate for the publisher network having the online content resource;

updating, by the computer processor, the performance characteristics of the publisher and the publisher network based on the generated click conversion score;

modifying, in response to updating the performance characteristics of the publisher, a payment rate to the publisher for conversions represented by the conversion data; and, facilitating payment, in response to each conversion associated with the online content resource provided by the publisher, to the publisher at the modified payment rate.

8. The method in accordance with claim 7, wherein each click conversion score represents a propensity of traffic generated by the advertisement link associated with the online content resource to convert.

9. The computer-implemented method of claim 7, wherein generating a click conversion score for the network comprises:

defining, by the computer processor, a structural hierarchy, the structural hierarchy being configured to organize the received one or more click signals from the Internet and the received conversation data from the network into a statistically significant data set; and, defining, by the computer processor, a temporal logic, the temporal logic being configured to assign increased significance to more recent time lag measurements compared to less recent time lag measurements.

10. A computer-implemented method for scoring an online content resource associated with a publisher of the online content resource, the method comprising:

maintaining, on electronic storage media, a publisher network profile for a publisher network having a plurality of publishers, the publisher network profile including an indication of performance characteristics of the publisher network;

receiving, by a computer processor via a first communication channel of the Internet, one or more click signals, each click signal representing a user selection of an advertising link associated with the online content resource provided by a publisher associated with the publisher network;

receiving, by the computer processor via a second communication channel of the Internet, conversion data representing a conversion of the user to a consumer of the online advertisement associated with the advertising link, each conversion being associated with at least one click signal;

measuring, by the computer processor, a time lag between a click signal, received over the first communication channel of the Internet, and an associated conversion;

generating, by the computer processor, a click conversion score for the publisher based on an association of the click signals and conversion data, and based on the time lag, the click conversion score comprising a publisher network score and a publisher score, the click conversion score representing a ratio of an actual conversion rate associated with the publisher to an expected conversion rate for the publisher that publishes the online content resource;

updating, by the computer processor, the performance characteristics of the publisher and the publisher network based on the generated click conversion score;

modifying, in response to updating the performance characteristics of the publisher, a payment rate to the publisher for the conversions; and, facilitating payment, in response to a conversion associated with the online content resource provided by the publisher, to the publisher at the modified payment rate.

11. The method in accordance with claim 10, wherein each click conversion score represents a propensity of traffic generated by the advertisement link associated with the online content resource to convert.

12. The computer-implemented method of claim 10, wherein generating a click conversion score for the publisher comprises:

defining, by the computer processor, a structural hierarchy, the structural hierarchy being configured to organize the received one or more click signals and the received conversation data into a statistically significant data set; and, defining, by the computer processor, a temporal logic, the temporal logic being configured to assign increased significance to more recent time lag measurements compared to less recent time lag measurements.

13. A computer-implemented system for scoring an online content resource, the system comprising:

a computer processor;

computer memory, communicatively coupled to the computer processor, storing one or more code modules, which, when executed by the processor perform a method, the method comprising:

maintaining, on the computer memory, a publisher network profile for a publisher network having a plurality of publishers, the publisher network profile including an indication of performance characteristics of the publisher network;

receiving, by the processor via a first communication channel of the Internet, one or more click signals, each signal representing a user selection of an advertising link associated with the online content resource provided by a publisher associated with the publisher network;

receiving, by the processor via a second communication channel of the Internet, conversion data representing a conversion of the user to a consumer of the online advertisement associated with the advertising link, each conversion being associated with at least one click signal;

measuring, by the processor, a time lag between a click signal, received over the first communication channel of the Internet, and an associated conversion;

generating by the processor at least one click conversion score based on an association of the click signals and conversion data, and based on the time lag, the at least one click conversion score comprising a publisher network score and a publisher score;

updating, by the computer processor, the performance characteristics of the publisher and the publisher network based on the generated click conversion score;

modifying, in response to updating the performance characteristics of the publisher, a payment rate to the publisher for conversions; and, facilitating payment, in response to a conversion associated with the online content resource provided by the publisher, to the publisher at the modified payment rate.

14. The computer-implemented system of claim 13, wherein generating at least one click conversion score comprises:

defining, by the computer processor, a structural hierarchy, the structural hierarchy being configured to organize the received one or more click signals and the received conversation data into a statistically significant data set; and, defining, by the computer processor, a temporal logic, the temporal logic being configured to assign increased significance to more recent time lag measurements compared to less recent time lag measurements.

* * * * *